United States Patent
Gretz

(10) Patent No.: US 6,355,883 B1
(45) Date of Patent: *Mar. 12, 2002

(54) ELECTRICAL FIXTURE MOUNTING BOX AND MOUNTING ASSEMBLY

(75) Inventor: Thomas J. Gretz, Clarks Summit, PA (US)

(73) Assignee: Arlington Industries, Inc., Scranton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/784,981

(22) Filed: Feb. 16, 2001

Related U.S. Application Data

(63) Continuation-in-part of application No. 09/373,431, filed on Aug. 13, 1999, now Pat. No. 6,191,362.

(51) Int. Cl.⁷ .................................................. H01H 9/02
(52) U.S. Cl. .......................................... 174/58; 220/4.02
(58) Field of Search ............................. 174/48, 50, 53, 174/58; 220/3.3, 3.9, 4.02; 248/906, 343; 52/39

(56) References Cited

U.S. PATENT DOCUMENTS

| | | | | |
|---|---|---|---|---|
| 2,891,755 A | * | 6/1959 | Clark | 248/222.12 |
| 3,767,151 A | * | 10/1973 | Seal et al. | 174/58 X |
| 3,770,873 A | * | 11/1973 | Brown | 174/58 |
| 3,993,212 A | * | 11/1976 | Ryan | 220/3.6 |
| 4,892,211 A | * | 1/1990 | Jorgensen | 248/906 X |
| 5,183,233 A | * | 2/1993 | LaPalomento | 52/39 X |
| 5,234,119 A | * | 8/1993 | Jorgensen et al. | 220/3.9 |
| 5,522,577 A | * | 6/1996 | Roesch | 248/343 |
| 5,854,443 A | * | 12/1998 | Reiker | 174/48 |
| 5,939,671 A | * | 8/1999 | Gretz | 174/50 |

* cited by examiner

Primary Examiner—Dean A. Reichard
Assistant Examiner—Dhiru R. Patel

(57) ABSTRACT

According to the present invention, there is provided an electrical junction box for mounting an electrical fan to a structure which junction box includes a channel further including longitudinal teeth that engage the rafter or other structural member to which the fan is to be attached. The engagement of the mounting box channel with the rafter resists lateral movement in a more substantial fashion thereby assuring that less stress is placed on the electrical box mounting screw(s). The longitudinal teeth positively engage the rafter when the electrical box is slideably inserted over the rafter. A hole is provided for further securing the electrical box to the rafter with a more conventional screw. A mounting assembly including apertures for the inclusion of mounting fasteners is also described.

3 Claims, 3 Drawing Sheets

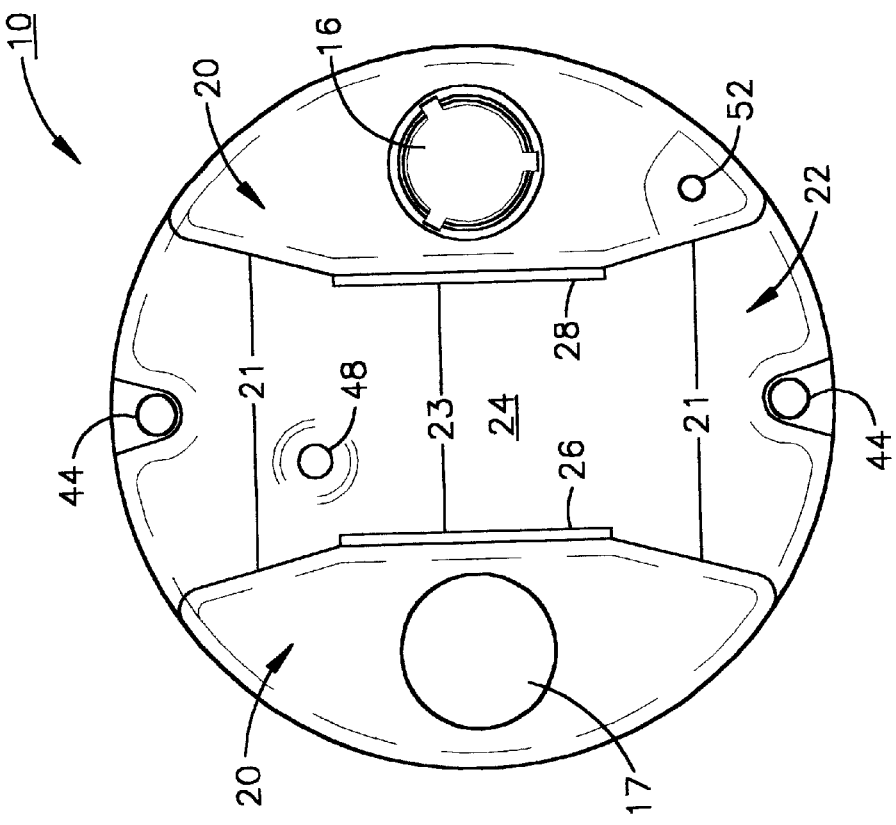
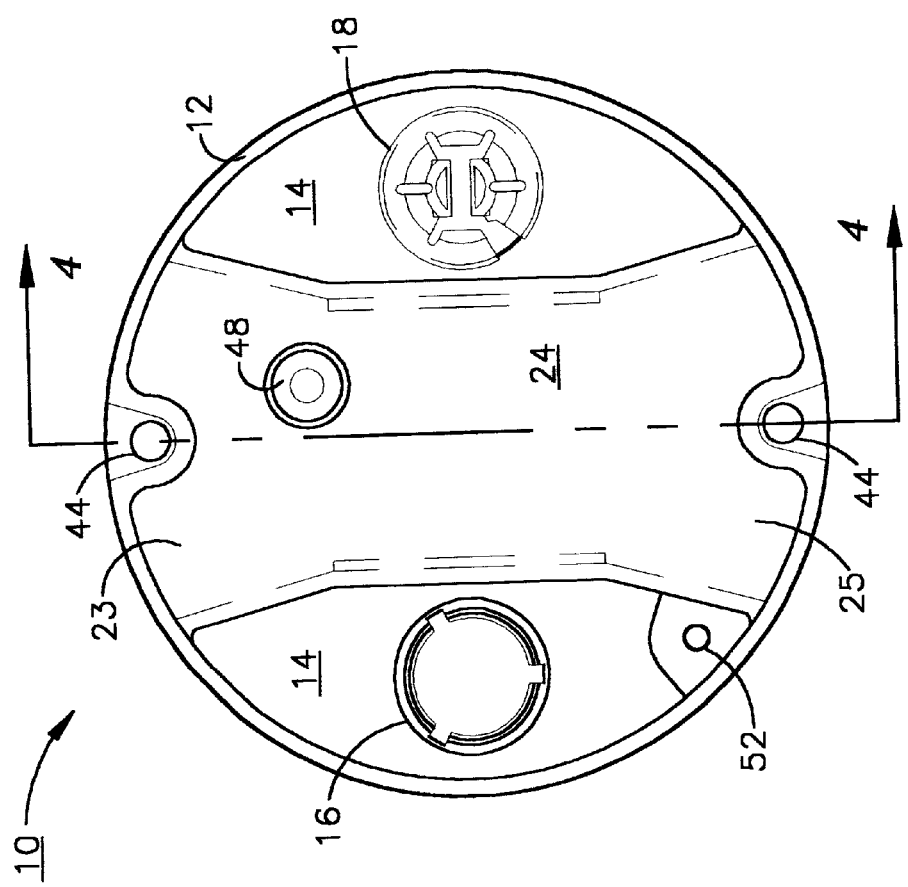

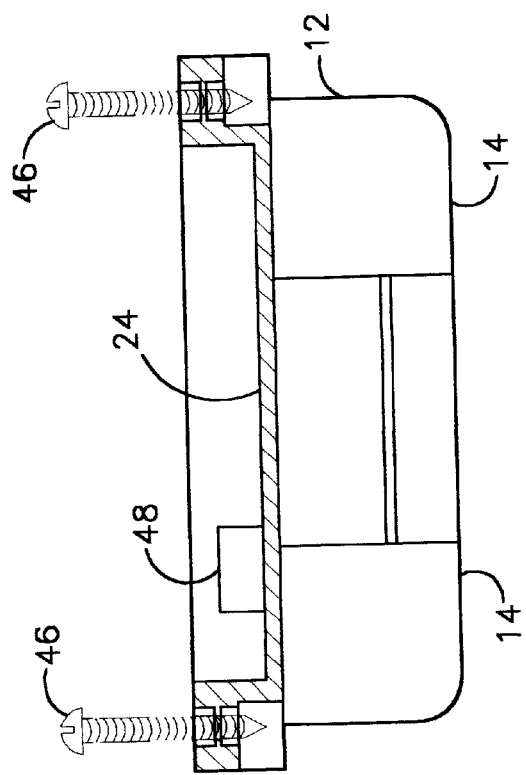
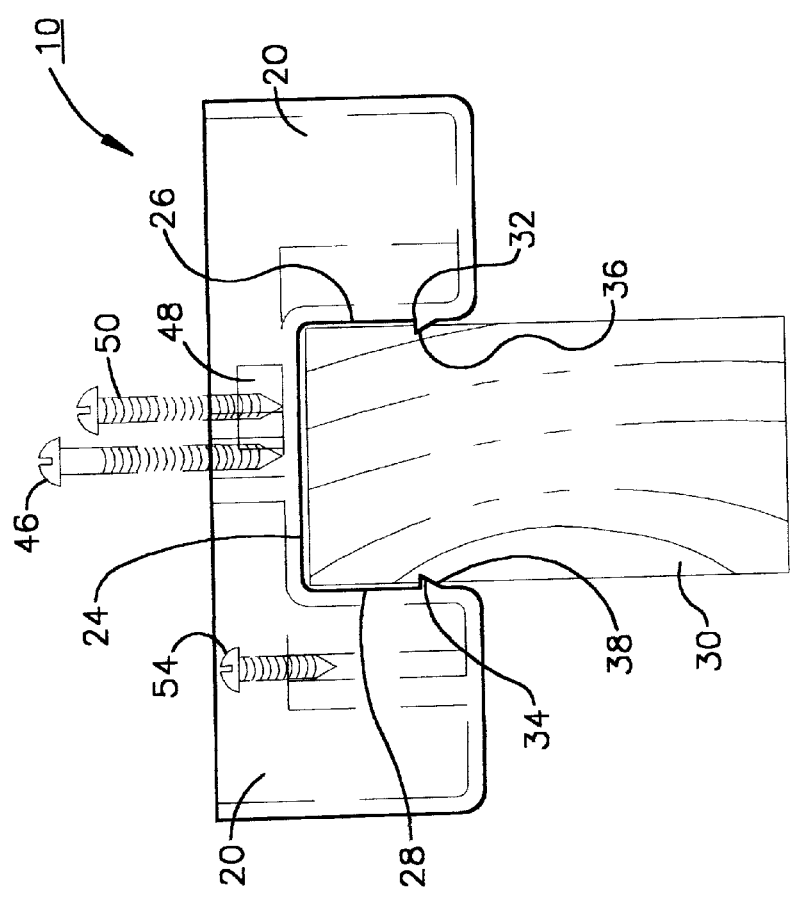

ELECTRICAL FIXTURE MOUNTING BOX AND MOUNTING ASSEMBLY

This application is a continuation-in-part of U.S. patent application Ser. No. 09/373,431 filed Aug. 13, 1999 now U.S. Pat. No. 6,191,362 and still pending.

FIELD OF THE INVENTION

The present invention relates to electrical device mounting assemblies and methods for their installation, and more particularly to a mounting assembly or block for ceiling fans, light fixtures and the like that require stable, heavy duty mounting structures.

BACKGROUND OF THE INVENTION

Mounting structures for electrical devices have met increasing demands for strength and stability with the advent and common installation of ceiling fans, particularly lighted such devices, and large chandeliers. While each of these electrical fixtures or devices has its own unique set of mounting problems, ceiling fans with their large heavy motors and often the addition of lighting devices, have posed a particular issue because of the large static loads which they represent when hung from a ceiling. Additionally, the fan rotation provides a dynamic load that also requires consideration when mounting such devices.

There have been numerous efforts in the prior art to provide adequate structure for the hanging or mounting of large electrical devices that represent large static and/or dynamic loads.

U.S. Pat. No. 4,892,211 To Jorgensen describes a ceiling box for mounting and supporting a ceiling fan on a ceiling. The ceiling box includes a top wall portion with a side wall portion surrounding the periphery of the top wall portion. The box is open at the end opposite the top wall portion and the side wall portion has a pair of flanges extending normal thereto into the open end of the box. These flanges have holes in them for receiving fan-supporting screws. In a first embodiment, a pair of threaded mounting screw holes are formed in the top wall portion and are each axially aligned with an unthreaded hole that extends through the respective flange. In a second embodiment, the holes in the flanges are also threaded for added support.

U.S. Pat. No. 5,183,233 to LaPalomento, describes a support for hanging an electrical fixture from a ceiling or wall and a method for suspending the fixture. The sup [port comprises a panel that is intended to be affixed to the grid work of a house and a support affixed to the panel that holds the electrical fixture. A slot is provided on the rear of the panel to hold the panel flush against a flat surface and to allow electrical wiring to connect to the electrical fixture.

U.S. Pat. No. 5,234,119 to Jorgensen et al, describes a plastic ceiling box adapted to support a ceiling fan and designed to be mounted on a structural member, such as a ceiling joist. The ceiling box comprises a body member having a lower wall and a pair of sidewalls defining a recess for snugly receiving a ceiling joist. Box mounting holes for receiving box mounting fasteners are located at opposite sides and ends of the lower wall for attaching the ceiling box to the joist. Openings for receiving fan supporting fasteners are formed in the body member adjacent the box member and aid in attaching the body member to the joist. This overall arrangement provides sufficient support and strength to resist dynamic loads imposed by the ceiling fan even though the ceiling box is made of plastic.

U.S. Pat. No. 5,522,577 to Roesch describes a mounting assembly for supporting a ceiling fan that includes a sup [port beam located inwardly of the ceiling surface a predetermined distance. An electrical box having a bottom wall is directly joined to and supported from the support beam. The box has sidewalls extending from the bottom wall through the ceiling substantially to the exposed ceiling surface and terminating in an open end. A rigid metal plate or disk member adapted for supporting and mounting a ceiling fan is positioned over the open end of the box. The disk member is of a size sufficient to have a peripheral portion extending radially beyond the side walls of the box and a plurality of mounting screws extend from the metal disk member through the interior of the box into connected engagement with the beam. The mounting screws support the disk member from the beam without reliance on the electrical box for support.

U.S. patent application Ser. No. 08/927,614 entitled "Ceiling Medallion Assembly" filed Sep. 11, 1997 in the name of Thomas J. Gretz describes a mounting assembly for holding an electrical device in place on a joist or stud. The assembly includes an electrical box having a planar base, preferably with three planar surfaces of different depths, a fastener device for temporarily securing an electrical box in place, a ceiling medallion for covering the electrical box, a second fastener device for temporarily securing the ceiling medallion to the electrical box and a fixation device for securely fastening the electrical box and a ceiling bezel to the joist or stud. The electrical box for mounting on the joist or stud includes: a generally rectangular housing with two opposite sides having a stepped appearance defining three different depths of the housing with a third side at a first shallow depth and a fourth side at a third deepest depth, a first back piece spanning the opposing sides at a first depth approximately equal to the thickness of the ceiling material, a second back piece spanning the opposites sides of the second depth that is greater than the first depth of the first back piece, the second depth being approximately equal to twice the thickness of the ceiling material and a third back piece spanning the opposite sides at a third depth that is greater than the second depth of the second back piece.

Although the foregoing methods and apparatus have all attempted to solve the problem of adequately mounting the increased loads of electrical fixtures, particularly fans, that place significant stresses upon the mounting structure as they rotate none provides for more than screw-type attachment of the electrical box to the rafter or other supporting structure. It would therefore be desirable to provide an electrical fan mounting assembly that because of its design and attachment scheme resists lateral movement that can result in loosening of the mounting screws.

SUMMARY OF THE INVENTION

According to the present invention, there is provided an electrical junction box for mounting an electrical fan to a structure which junction box includes a channel further including longitudinal teeth that engage the rafter or other structural member to which the fan is to be attached. The engagement of the mounting box channel with the rafter resists lateral movement in a more substantial fashion thereby assuring that less stress is placed on the electrical box mounting screw(s). The longitudinal teeth positively engage the rafter when the electrical box is slideably inserted over the rafter. A hole is provided for further securing the electrical box to the rafter with a more conventional screw.

DESCRIPTION OF THE DRAWINGS

FIG. 1 is a bottom view of the electrical junction box of the present invention.

FIG. 2 is a top view of the electrical junction box of the present invention.

FIG. 3 is a partially phantom side view of the electrical junction box of the present invention installed over a rafter or other structural member.

FIG. 4 is a cross-sectional view of the electrical junction box of the present invention along the line A—A of FIG. 2.

DETAILED DESCRIPTION

Figure 5:
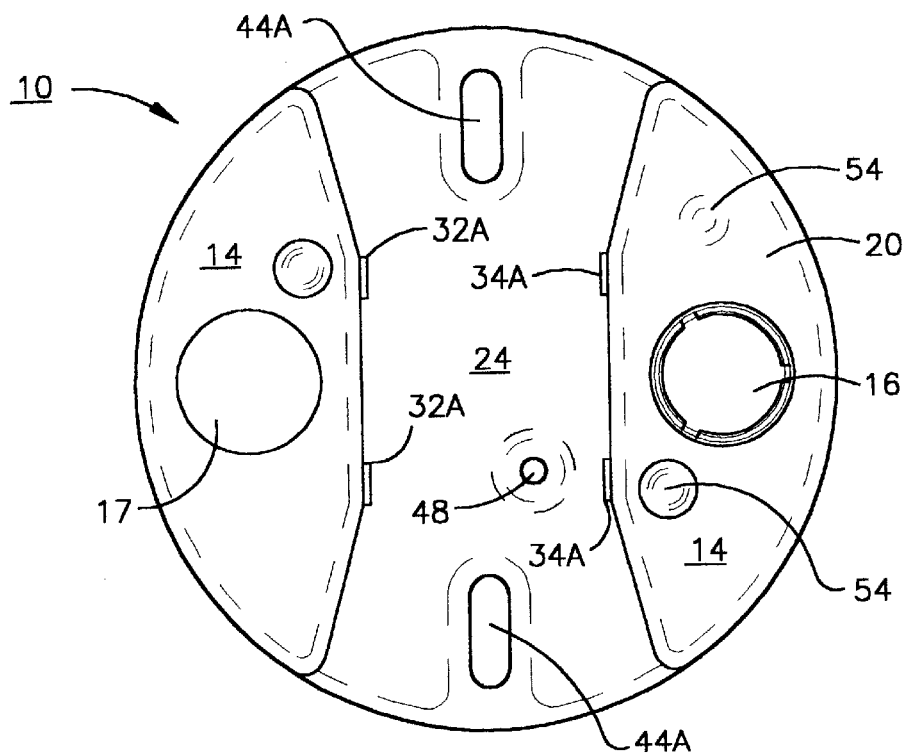
FIG. 5 is a top view of an alternative preferred embodiment of the electrical junction box of the present invention incorporating mounting fasteners.

As shown in FIG. 1, electrical junction box 10 of the present invention comprises an outer periphery defined by side wall 12, a top 14 having a knockout 16 and, according to a preferred embodiment, a low profile connector 18 inserted into hole 17. Low profile connector 18 may be replaced with a more conventional knockout, if desired. Similarly, a second low profile connector may be used in lieu of knockout 16. The particular shape of electrical junction box 10 is not critical and a square or octagonal configuration is similarly useful providing the channel defined hereinafter is appropriately located therein.

Top 14 and consequently volume 20 of electrical box 10 that is defined by top 14 and side wall(s) 12 are bisected by channel 22 that is defined by channel bottom 24 and generally parallel channel side walls 26 and 28. Channel sidewalls 26 and 28 extend orthogonally or at right angles from top 14 toward the interior of electrical box 10 into volume 20 of electrical box 10. The distance between channel side walls 26 and 28 is approximately equal to the width of a rafter 30 or other structural member to which electrical box 10 will be applied as shown in FIG. 3. Channel 22 extends into volume 20 of electrical box 10 to a depth equal to from about ½ to about ¾ of the depth of side wall(s) 12. Typically, side wall(s) 12 are about 1.5 inches deep and channel 22 is about 1.0 inches deep.

As shown in the attached drawings, channel 22 is depicted as being "flared", i.e. its extremities are wider, dimension 21, than the width of the central portion of channel 22, dimension 23, that is designed to engage rafter 30. This "flaring" or widening of channel 22 at its extremities is preferred for ease of installation.

The interior side of side walls 26 and 28 include longitudinal teeth 32 and 34 that are shaped to slide over rafter 30 upon application of electrical box 10 over rafter 30 as shown in FIG. 3, but to "bite" into rafter 30 when force is applied to withdraw electrical box 10 from rafter 30. Teeth 32 and 34 accordingly have front surfaces 36 and 38 that present an angle of about 30° to rafter 30 upon application thereto and rear surfaces 40 and 42 that present an angle of about 90° to rafter 30 when an attempt is made to remove electrical box 10 from rafter 30 after application of electrical box 10 over rafter 30 as shown in FIG. 3. As will be apparent to the skilled artisan, multiple longitudinal teeth or a suitable configuration of short teeth could also be used to accomplish the objectives of the present invention, and all of these alternatives should be considered equivalents of the "longitudinal teeth" described herein.

As shown most clearly in FIG. 4, bottom 24 of channel 22 includes at its extremities in the area of side wall(s) 12, a pair of holes 44 of a size and spacing to receive mounting screws 46 of a subsequently installed electrical fan (not shown).

Holes 44 are typically slightly less than 0.25 inches to frictionally engage screws 46 that are typically #10 and about 0.25 inches in diameter. Holes 44 are preferably about 0.50 inches deep as this is the depth needed to hold screws 46 in the typical installation.

Bottom 24 of channel 22 also includes a boss 48 for insertion of screw 50 that serves to securely fasten electrical box 10 to rafter 30 after application thereof to rafter 30.

A final hole 52 is preferably provided for frictional engagement of a grounding screw 54 that is used in the final installation of the electrical fan (not shown).

Figure 6:
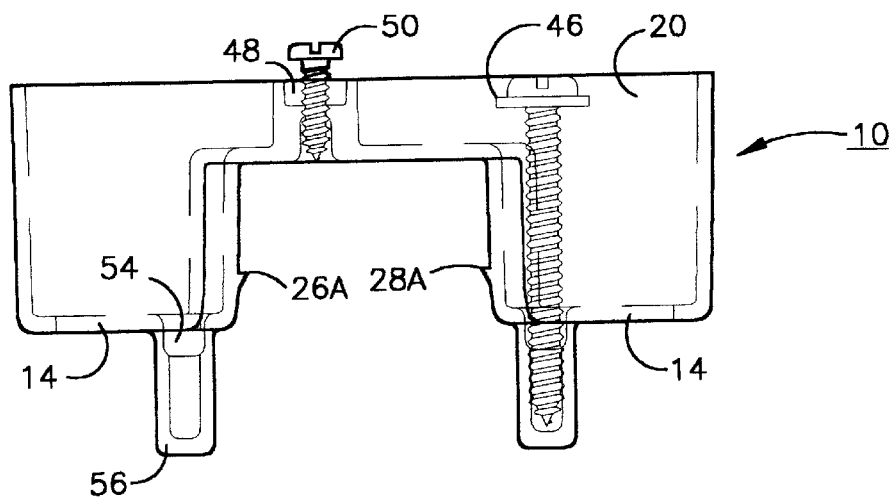
FIG. 6 is a partially phantom side view of the electrical junction box of FIG. 5.

Referring now to FIG. 5 that depicts an alternative preferred embodiment of the electrical junction of the present invention, i.e. a prepackaged electrical junction box or mounting assembly, electrical junction box 10 includes, in addition to the elements previously described, a pair of apertures 54 defined by extended recesses 56 in top 14, best seen in FIGS. 6 and 7. Additionally, apertures 44, in lieu of being round are now preferably elongated to form slots to permit variability in the location of screws or bolts 46 mounted therein as previously described. Also, teeth 32A and 34A in FIGS. 5–7 are abbreviated versions of elongated teeth 32 and 34 previously described that provide the same utility but with less material while rendering installation somewhat easier.

The purpose and utility of apertures 54 is to provide a location for the placement of mounting bolts or screws 46 during shipment and prior to installation. As is well recognized by those employed in the electrical trades, mounting bolts or screws for the attachment of ceiling fans or other electrical fixtures are often misplaced or left at a position remote from the installation site, for example on the floor, requiring time and effort to locate the screws or bolts or the acquisition of replacements to complete an installation. The inclusion of mounting bolts or screws, frictionally engaged in apertures 54 assures the immediate availability of such fasteners at the appropriate time in the installation process. Similarly, it is contemplated that screw 50 that is used to fasten electrical junction box 10 to a rafter 30 via aperture 48 be similarly included by frictional engagement in aperture 48 during shipping and prior to installation as shown in FIG. 6.

As will be apparent to the skilled artisan, the concept of prepackaging required fasteners with various electrical junction boxes and the like by frictional engagement of the fasteners in suitably designed and located apertures is also novel and forms part of the instant invention.

As the invention has been described, it will be apparent to those skilled in the art that the same may be varied in many ways without departing from the spirit and scope of the invention. Any and all such modifications are intended to included within the scope of the appended claims.

What is claimed is:

1. A mounting assembly comprising:
   A) an electrical junction box having at least one side wall and a bottom defining an interior volume;
   B) a channel comprising a pair of approximately parallel side walls extending at right angles from said bottom and a channel bottom, joining said channel side walls and bisecting said interior volume, said channel including an open side;
   C) teeth on at least a portion of each of said approximately parallel side walls within said channel; and
   D) in said bottom, at least one aperture defined by a recess in said bottom for the receipt and frictional engagement of a fastener prior to installation said channel being of a width that said teeth frictionally engage vertical sides of a rafter or other structural member when said channel is applied over said rafter or said other structural member at said open side.

2. The mounting assembly of claim 1 comprising two apertures and including fasteners frictionally engaged in both of said apertures.

3. A mounting assembly comprising:

A) an electrical junction box having at least one side wall and a bottom defining an interior volume;

B) a channel comprising a pair of approximately parallel side walls extending at right angles from said bottom and a channel bottom, joining said channel side walls and bisecting said interior volume, said channel including an open side;

C) teeth on at least a portion of each of said approximately parallel side walls within said channel;

D) in said bottom, at least one aperture defined by a recess in said bottom for the receipt and frictional engagement of a fastener prior to installation; and E) at least one fastener suitable for subsequent attachment of an electrical fixture to said mounting box frictionally engaged in said aperture; said channel being of a width that said teeth frictionally engage vertical sides of a rafter or other structural member when said channel is applied over said rafter or said other structural member at said open side.

* * * * *